(12) United States Patent
Mokri et al.

(10) Patent No.: US 6,781,331 B2
(45) Date of Patent: Aug. 24, 2004

(54) METHOD AND APPARATUS FOR REGULATING MOTOR GENERATOR OUTPUT

(75) Inventors: James Steven Mokri, Los Gatos, CA (US); Nelso Petroni, San Jose, CA (US); William Michael Steiner, San Jose, CA (US); Stephen L. Joslin, San Jose, CA (US); Craig Ernest Leighty, Pleasanton, CA (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 10/243,309

(22) Filed: Sep. 13, 2002

(65) Prior Publication Data

US 2004/0051487 A1 Mar. 18, 2004

(51) Int. Cl.[7] .............................. H02P 7/66; H02P 11/06; G21C 9/00; G21C 7/32; G21C 19/28
(52) U.S. Cl. ............................ 318/157; 322/29; 322/32; 322/39; 376/282; 376/328; 376/361; 376/370
(58) Field of Search ................................. 318/157, 156, 318/142, 145, 147, 149, 459, 500, 504; 322/14, 29, 38, 32, 39, 28, 16, 22–25; 361/236; 363/102, 150, 174–176; 376/282, 299, 328, 329, 361, 370–376, 404, 408

(56) References Cited

U.S. PATENT DOCUMENTS

| | | | | |
|---|---|---|---|---|
| 4,291,404 A | * | 9/1981 | Steiner | 714/724 |
| 4,375,614 A | * | 3/1983 | Steiner | 323/280 |
| 4,457,889 A | * | 7/1984 | Vienne | 376/282 |
| 4,948,551 A | * | 8/1990 | Onfroy | 376/216 |
| 5,293,411 A | * | 3/1994 | Miyamoto et al. | 376/210 |
| 5,295,171 A | * | 3/1994 | Aburomia et al. | 376/372 |
| 5,610,957 A | * | 3/1997 | Tanikawa et al. | 376/210 |
| 5,610,958 A | * | 3/1997 | Shimano et al. | 376/277 |
| 5,621,777 A | * | 4/1997 | Ring | 376/277 |
| 5,963,611 A | * | 10/1999 | Narabayashi et al. | 376/371 |

* cited by examiner

*Primary Examiner*—Shih-Yung Hsieh
*Assistant Examiner*—Edgardo San Martin
(74) *Attorney, Agent, or Firm*—Armstrong Teasdale LLP

(57) ABSTRACT

A method and system of regulating an output voltage of a boiling water reactor nuclear reactor plant recirculation system motor generator are provided. The method includes sensing an alternator output voltage and transmitting an alternator output voltage signal to a voltage regulator circuit, sensing an alternator speed and transmitting an alternator speed signal to the voltage regulator circuit, comparing the alternator output voltage signal to the alternator speed signal with a volts per hertz divider network electrically coupled to the alternator output voltage sensing circuit and the alternator speed sensing device, adjusting a capacitive reactance of the voltage regulator with a lead compensation circuit electrically coupled in series with the volts per hertz divider network, and adjusting a current in a control winding of a saturable reactor.

33 Claims, 5 Drawing Sheets

US 6,781,331 B2

METHOD AND APPARATUS FOR REGULATING MOTOR GENERATOR OUTPUT

BACKGROUND OF THE INVENTION

This invention relates generally to nuclear reactors, and more particularly to systems and methods stabilizing voltage regulators in nuclear reactor recirculation systems.

A reactor pressure vessel (RPV) of a boiling water reactor (BWR) has a generally cylindrical shape and is closed at both ends, e.g., by a bottom head and a removable top head. A top guide typically is spaced above a core plate within the RPV. A core shroud surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

The core of the reactor includes an array of fuel bundles with square cross section. The fuel bundles are supported from below by a fuel support. Each fuel support supports a group of four fuel bundles. The heat generated in the core can be decreased by inserting control rods into the core, and the generated heat can be increased by retracting control rods from the core. In some known BWR's, the control rods have a cruciform cross section with blades that can be inserted between the fuel bundles of a group of four.

Historically, reactors were designed to operate at a thermal power output higher than the licensed rated thermal power level. To meet regulatory licensing guidelines, reactors are operated at a maximum thermal power output less than the maximum thermal power output the reactor is capable of achieving. These original design bases include large conservative margins factored into the design. After years of operation, it has been found that nuclear reactors can be safely operated at thermal power levels higher than originally licensed. It has also been determined that changes to operating parameters and/or equipment modifications will permit safe operation of a reactor at significantly higher maximum thermal power output (up to and above 120% of original licensed power).

Reactor plant systems, such as, the reactor recirculation system are evaluated to ensure their capabilities can support the reactor plant's operation at the higher power output levels. Where appropriate, changes are made to such systems to improve their performance.

BRIEF DESCRIPTION OF THE INVENTION

In one aspect, a method of regulating an output voltage of a boiling water reactor nuclear reactor plant recirculation system motor generator is provided. The method includes sensing an alternator output voltage and transmitting an alternator output voltage signal to a voltage regulator circuit, sensing an alternator speed and transmitting an alternator speed signal to the voltage regulator circuit, comparing the alternator output voltage signal to the alternator speed signal with a volts per hertz divider network electrically coupled to the alternator output voltage sensing circuit and the alternator speed sensing device, adjusting a capacitive reactance of the voltage regulator with a lead compensation circuit electrically coupled in series with the volts per hertz divider network, and adjusting a current in a control winding of a saturable reactor.

In another aspect, a voltage regulator for a boiling water reactor nuclear reactor plant recirculation system is provided. The regulator includes a variable frequency alternator, an alternator output voltage sensing circuit electrically coupled to a control circuit, an alternator speed sensing device electrically coupled to the control circuit, a volts per hertz divider network electrically coupled to the alternator output voltage sensing circuit and the alternator speed sensing device, a lead compensation circuit electrically coupled in series with the volts per hertz divider network, and a saturable reactor including a control winding electrically coupled to the volts per hertz divider network output, and a secondary winding electrically coupled to said alternator exciter.

DETAILED DESCRIPTION OF THE INVENTION

Figure 1:
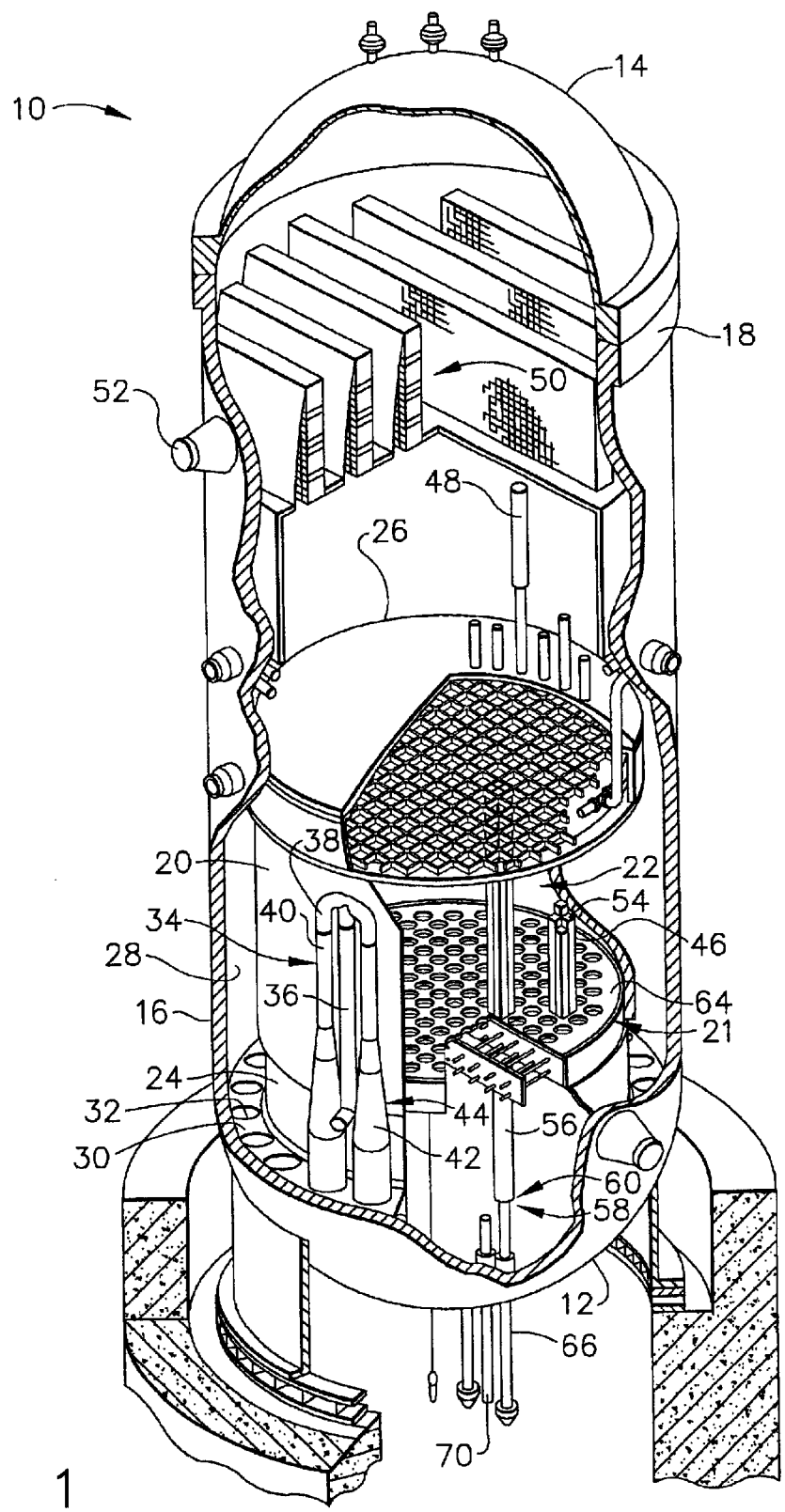
FIG. 1 is a sectional view of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22 and a bypass water region, called a reflector 21. Core shroud 20 is supported at one end by a shroud support 24 and includes an opposed removable shroud head 26. A downcomer region 28 is an annulus formed between core shroud 20 and side wall 16. A pump deck 30, which has a ring shape, extends between shroud support 24 and RPV side wall 16. Pump deck 30 includes a plurality of circular openings 32, with each opening housing a jet pump 34. Jet pumps 34 are circumferentially distributed around core shroud 20. An inlet riser pipe 36 is coupled to two jet pumps 34 by a transition assembly 38. Each jet pump 34 includes an inlet mixer 40, and a diffuser 42. Inlet riser 36 and two connected jet pumps 34 form a jet pump assembly 44.

Heat is generated within core 22, which includes a plurality of fuel bundles 46 of fissionable material. Water circulated up through core 22 is at least partially converted to steam. A plurality of steam separators 48 separate steam from water, which is recirculated. A plurality of steam dryers 50 remove residual water from the steam. The steam exits the RPV 10 through a steam outlet 52 near vessel top head 14.

The amount of heat generated in core 22 is regulated by inserting and withdrawing a plurality of control rods 54 of neutron absorbing material, for example, hafnium. To the extent that control rod 54 is inserted adjacent fuel bundle 46, it absorbs neutrons that would otherwise be available to promote the chain reaction which generates heat in core 22.

Each control rod 54 couples through a control rod drive tube 56 with a control rod drive mechanism (CRDM) 58 to form a control rod apparatus 60. CRDM 58 moves control rod 54 relative to a core support plate 64 and adjacent fuel bundles 46. CRDM 58 extends through bottom head 12 and is enclosed in a control rod drive mechanism housing 66. A control rod guide tube 56 extends vertically from the control rod drive mechanism housing 66 to core support plate 64. Control rod guide tubes 56 restrict non-vertical motion of control rods 54 during control rod 54 insertion and withdrawal. Control rod guide tubes 56 can have any number of shapes, for example a cruciform shape, a cylindrical shape, a rectangular shape, a Y-shape, and any other suitable polygonal shape.

Figure 2:
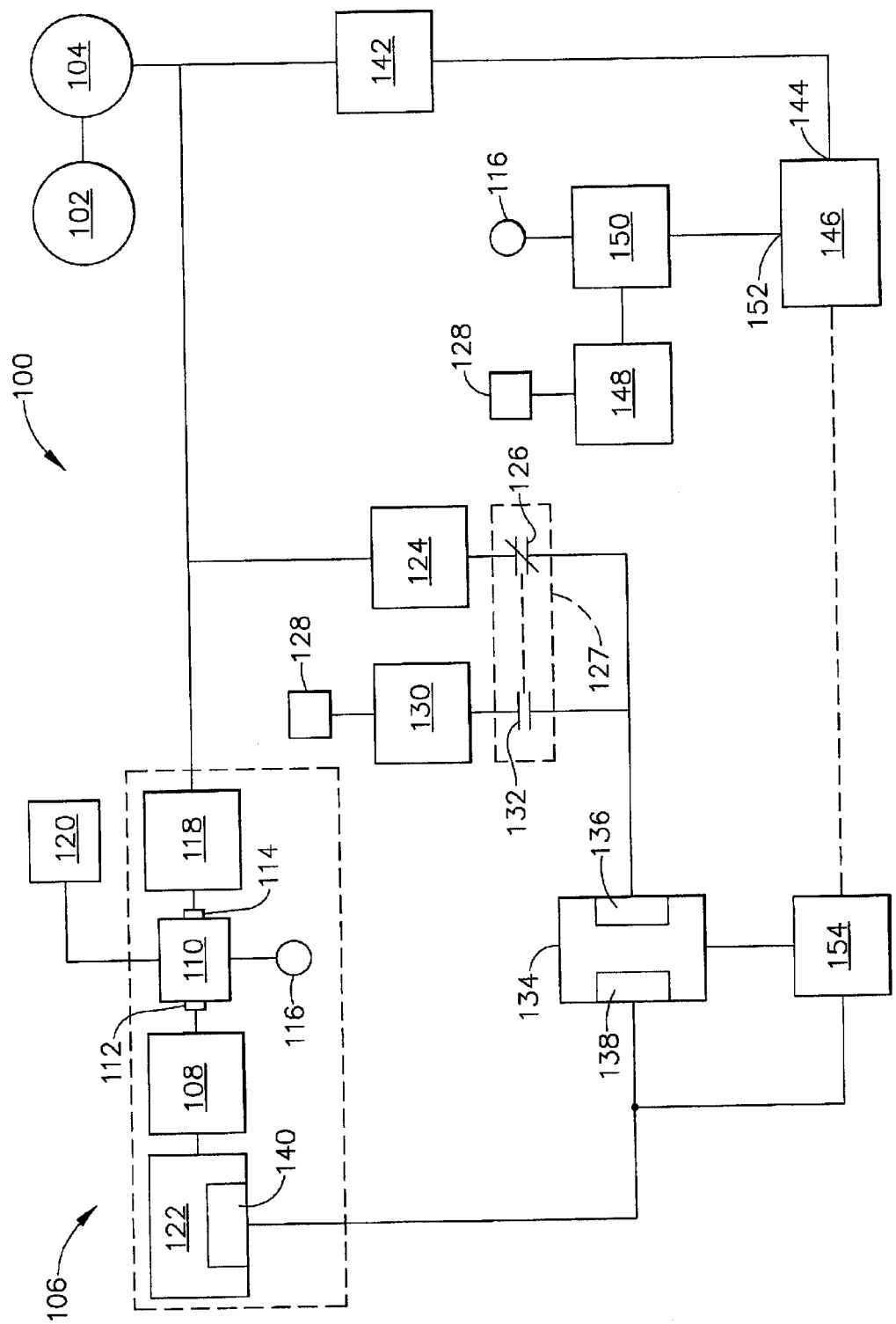
FIG. 2 is a block diagram of a reactor recirculation system motor-generator set voltage regulator.

FIG. 2 is a block diagram of a reactor recirculation system motor-generator set voltage regulator 100 in accordance with an exemplary embodiment of the present invention. A reactor recirculation pump 102 supplies motive power to reactor water in a reactor recirculation system (not shown). Pump 102 is mechanically coupled to a reactor recirculation pump motor 104. Motor 104 receives variable frequency alternating current (AC) power from a reactor recirculation system motor-generator set (MG) 106. During normal operation of the recirculation system, the frequency of the AC power varies between a range of 15 cycles per second (Hz) and 60 Hz. The frequency may be as low as 11 Hz during normal starting of MG 106. MG 106 includes an induction drive motor 108 mechanically coupled to a hydraulic variable speed control 110. Speed control 110 includes an input power couple 112, an output power couple 114, and a speed sensing device 116 mechanically coupled proximate a rotating member of speed control 110, such that an electrical output of speed sensing device 116 is proportional to a rotational speed of output power couple 114. In the exemplary embodiment, speed-sensing device 116 is a speed transducer. In another embodiment, device 116 is a tachometer-generator. Output couple 114 is mechanically coupled to a variable frequency alternator 118, which supplies variable frequency (AC) power to reactor recirculation pump motor 104. The rotational speed of alternator 118 fixes the frequency of the AC power supplied to motor 104. The rotational speed of alternator 118 is controlled by speed control 110. Speed control 110 is a hydraulic device which varies its output speed in response to control inputs from a recirculation system flow control circuit 120 by varying the hydraulic coupling of internal rotating members. An AC brushless exciter 122 is electrically coupled to MG 106 and supplies excitation to MG 106 thereby controlling an output voltage of alternator 118.

Alternator 118 output is electrically coupled to a primary winding of a transformer 124. A secondary winding of transformer 124 is electrically coupled to a first side of a normally closed contact 126 of a relay 127. An external 120-volt, 60 Hz power source 128 is electrically coupled to a primary winding of a transformer 130. A secondary winding of transformer 130 is electrically coupled to a first side of a normally open contact 132 of relay 127. A second side of contacts 126 and 132 are electrically connected to a power rectifier circuit 134. Power rectifier circuit 134 includes a full wave rectifier circuit 136 and a firing circuit 138. The output of firing circuit 138 is electrically connected to a field 140 of exciter 122.

Alternator 118 output is also electrically coupled to a primary winding of a three phase transformer 142. A secondary winding of transformer 142 is electrically connected to a first input 144 of a control circuit 146. User's power source 128 is also electrically coupled to a power supply 148. Power supply 148 is electrically coupled to speed sensing device 116 and provides a bias voltage and to speed sensing device 116 which provides an input to control circuit 146. Control circuit 146 is magnetically coupled to a negative and positive feedback circuit 154 through a saturable reactor (not shown). An input to negative and positive feedback circuit 154 is electrically connected to field 140 of exciter 122.

In operation, voltage regulator 100 controls the output voltage of MG 106 by controlling the excitation of alternator 118. Input power to rectifier 136 is supplied from one of user's power source 128 through transformer 130 and alternator 118 output through transformer 124. The selection of power supply is determined by the state of relay 127. When relay 127 is in an energized state whereby a coil internal to relay 127 is receiving electrical power, contact 132 is closed and contact 126 is open. In this state rectifier 136 is receiving power from power supply 128. This is the normal case during startup of the recirculation system. After the recirculation system has been started and MG 106 is running input power to rectifier 136 is switched to alternator 118 output by deenergizing relay 127 which reverses the positions of contacts 132 and 126 such that contact 126 is closed and contact 132 is open.

Power from one of power supply 128 and alternator 118 output is applied to power rectifier circuit 134 of up to 240 Vac, supplying power to full wave rectifier 136 through an inductive filter. Firing circuit 138 regulates the rectified waveform from rectifier 136 to supply a voltage and current for exciter field 140.

A current from negative and positive feedback circuit 154 is supplied to a winding of a saturable reactor to change the system gain (positive feedback) and transient response (negative feedback). Circuit 154 has a base capacitance of 560 microfarads and a switch to add 560 microfarads more capacitance. Test points are included to connect an external potentiometer to dial-in the additional capacitance to minimize a transient. Additional stability of voltage regulator 100 is provided by a lead compensation circuit in control circuit 146.

Control circuit 146 compares speed sensing device output voltage at input 152 and the alternator 118 output voltage at input 144 to a volts/hertz adjustment potentiometer setting and provides a current to the control coil of a saturable reactor.

Figure 3:
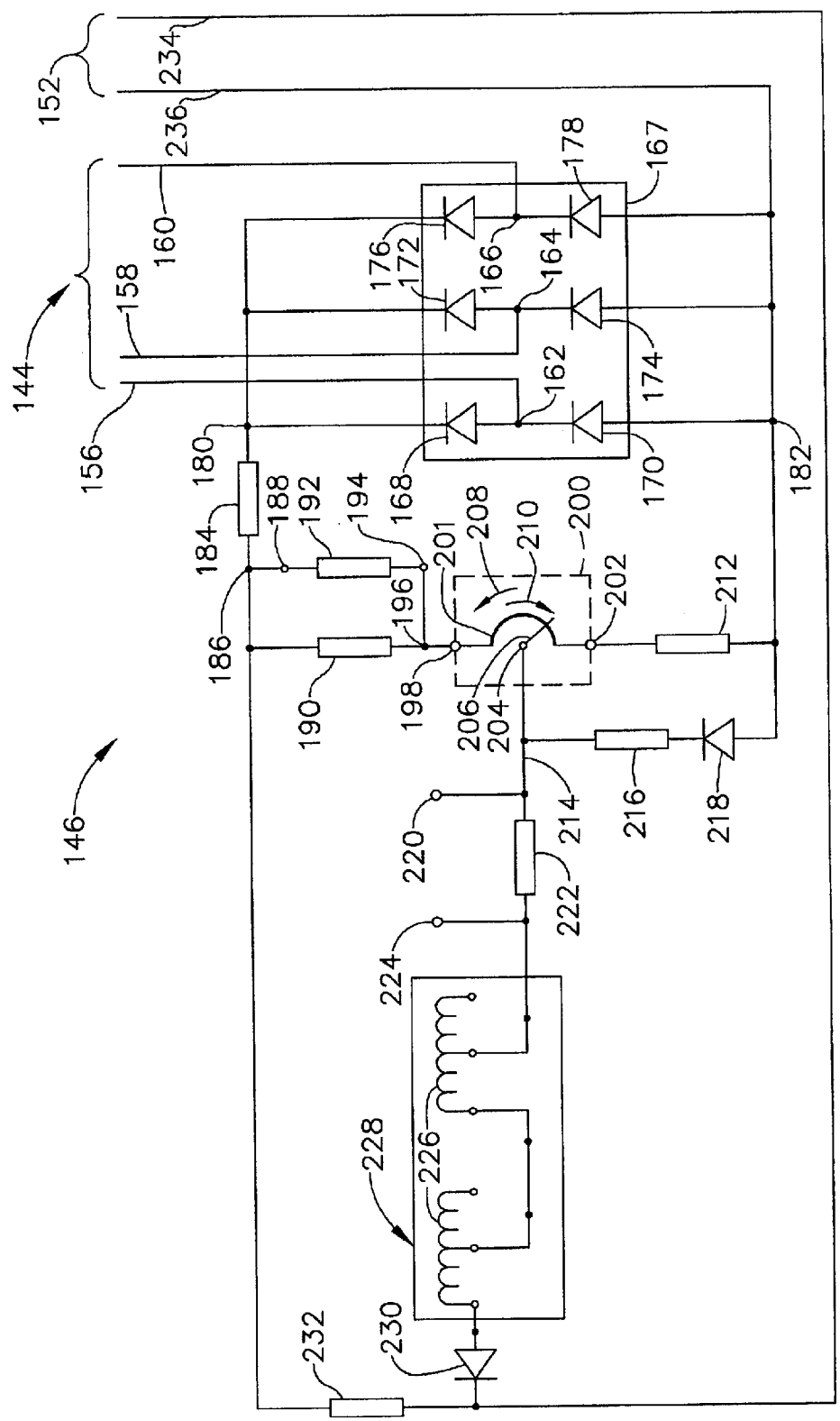
FIG. 3 is schematic diagram of a control circuit of a motor-generator (MG) voltage regulator.

FIG. 3 is schematic diagram of a control circuit 146 of voltage regulator 100. Input 144 includes three phase lines 156, 158 and 160. Phase lines 156, 158 and 160 are electrically coupled to nodes 162, 164 and 166 respectively of three phase full wave rectifier 167. Node 162 is electrically coupled to an anode of a rectifier 168 and a cathode of a rectifier 170. Node 164 is electrically coupled to an anode of a rectifier 172 and a cathode of a rectifier 174. Node 166 is electrically coupled to an anode of a rectifier 176 and a cathode of a rectifier 178. A cathode of each of rectifiers 168, 172 and 176 is electrically coupled to node 180. An anode of each of rectifiers 104, 174, and 178 is electrically coupled to node 182. Node 180 is electrically coupled to a first lead of a resistor 184. A second lead of resistor 184 is electrically coupled to node 186. In one embodiment, resistor 184 is a 330 ohm resistor. Node 186 is a positive direct current voltage with respect to node 182. In the exemplary embodiment, when the AC input voltage to rectifier 167 is for example 230 VAC, the potential difference of node 186 with respect to node 182 is about 260 VDC.

Node 186 is electrically coupled to a lead compensation circuit input 188 and a first lead of a resistor 190. In the exemplary embodiment, resistor 190 is a 680 ohm resistor. Input 188 is electrically coupled to a first end of lead compensation circuit 192. A second end of circuit 192 is electrically coupled to output 194. Output 194 and a second lead of resistor 190 are electrically coupled to node 196. Node 196 is electrically coupled to a first lead 198 of a potentiometer 200. Lead 198 is electrically coupled through a resistance 201 to a second lead 202 of potentiometer 200. In the exemplary embodiment, the amount of resistance between lead 198 and lead 202 is 800 ohms when potentiometer 200 is in a shelf state, i.e. no leads connected to a circuit. In another embodiment, potentiometer 200 is rated for 50 watts. A third lead 204 of potentiometer 200 is electrically coupled to resistance 201 of potentiometer 200 in a variable manner through a wiper 206, such that when wiper 206 is rotated in a first direction 208, a value of resistance between lead 204 and lead 198 is substantially zero ohms and the value of resistance between lead 204 and lead 202 is substantially equal to the value of resistance between lead 198 and lead 202, and when wiper 206 is rotated in a second direction 210, a value of resistance between lead 204 and lead 202 is substantially zero ohms and the value of resistance between lead 204 and lead 198 is substantially equal to the value of resistance between lead 198 and lead 202. In another embodiment, potentiometer 200 is a rotary make-before-break switch with a plurality of fixed resistors electrically coupled in series providing the resistance 201 between lead 198 and lead 202 and switch contacts that provide electrical coupling between lead 204 and resistance 201. Lead 202 is electrically coupled to a first lead of resistor 212 and a second lead of resistor 212 is electrically coupled to node 182. In one embodiment, resistor 212 is a one thousand ohm resistor.

Lead 204 is electrically coupled to node 214. Node 214 is further electrically coupled to a first lead of a resistor 216. A second lead of resistor 216 is electrically coupled to a cathode of diode 218. An anode of diode 218 is electrically coupled to node 182.

Node 214 is further electrically coupled to test point 220 and to a first lead of a resistor 222. A second lead of resistor 222 is electrically coupled to a test point 224 and to a first lead of a control coil 226 of a saturable reactor 228. A second lead of control coil 226 is electrically coupled to an anode of diode 230. A cathode of diode 230 is electrically coupled to a first lead of a resistor 232. A second lead of resistor 232 is electrically coupled to node 186. The first lead of resistor 232 and the cathode of diode 230 are further electrically coupled to a first line 234 of input 152. A second line 236 of input 152 is electrically coupled to node 182. Saturable reactor 228 is magnetically coupled to a primary winding (not shown) in power rectifier circuit 134 and a secondary winding (not shown) in negative and positive feedback circuit 154.

In operation, control circuit 146 compares speed device 116 voltage at input 152 and alternator 118 outage voltage at input 144 to a setting at potentiometer 200 and develops a current output to control coil 226. Magnetic flux created in the saturable reactor due to the combined effects of current flow in control coil 226, primary winding (positive feedback) and secondary winding (negative feedback) controls the firing characteristics of firing circuit 138. An increase in control coil 226 current reduces the degree of saturation of saturable reactor 228 and thus reduces the output of voltage regulator 100 to exciter 122. Stability of the voltage regulator 100 system is governed by two feedback adjustments. Capacitance in feedback circuit 154 is adjusted by switching in up to a maximum of approximately 1120 microfarads. Additional stability is added using lead compensation circuit 192.

Figure 4:
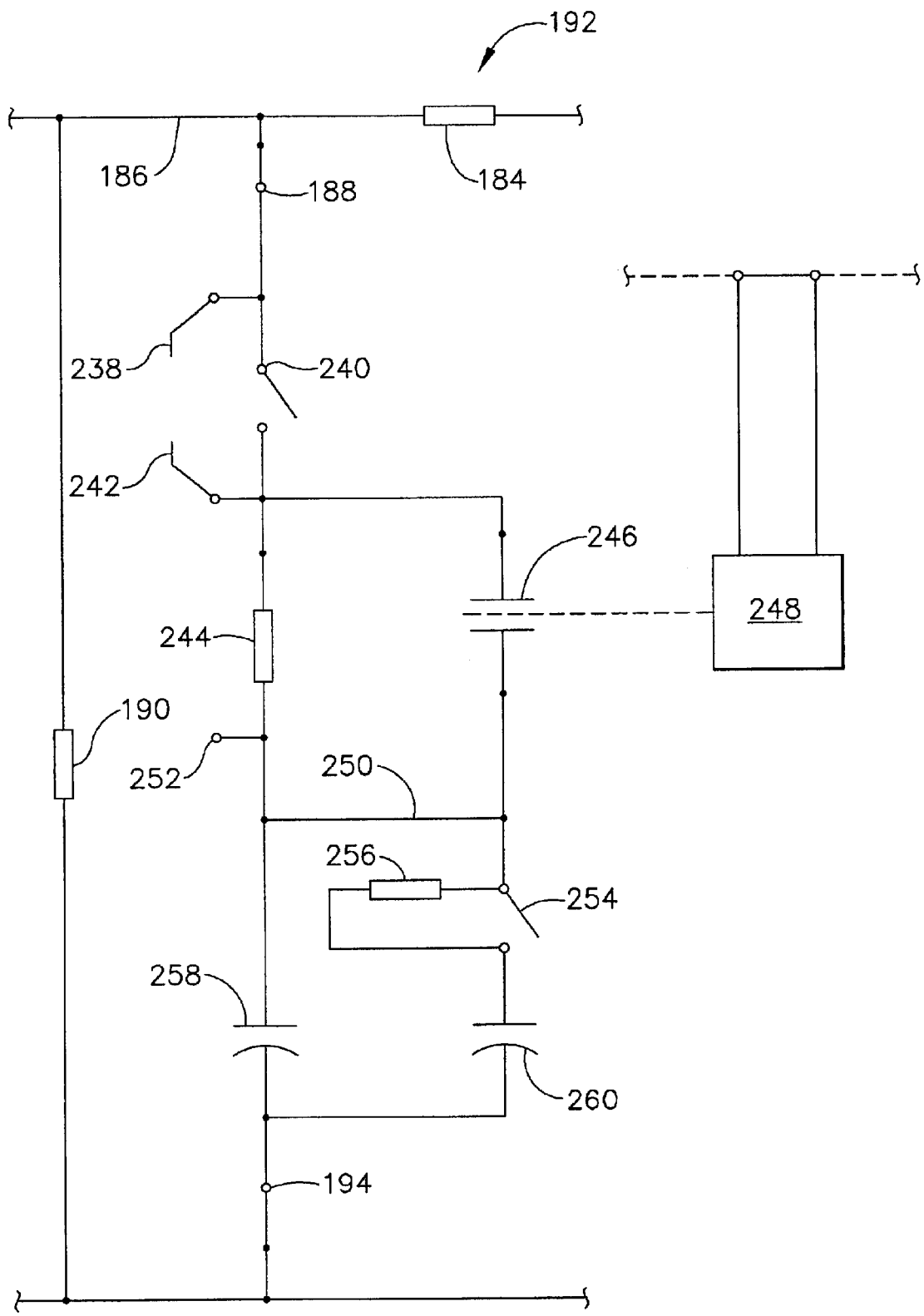
FIG. 4 is a schematic diagram of lead compensation circuit.

FIG. 4 is a schematic diagram of lead compensation circuit 192. Input 188 is electrically coupled to turning point and a first lead of switch 240. A second lead of switch 240 is electrically coupled to a tuning point 242, a first lead of resistor 244 and a first lead of a contact 246 of time delay relay 248. A coil of relay 248 is electrically coupled to the recirculation system control system (not shown). A second lead of contact 246 is electrically coupled to a node 250. A second lead of resistor 244 is electrically coupled to a tuning point 252 and node 250. Node 250 is further electrically coupled to a first lead of switch 254, a first lead of resistor 256, and a first lead of capacitor 258. A second lead of resistor 256 is electrically coupled to a second lead of switch 248 and a first lead of capacitor 260. A second lead of capacitor 258 and a second lead of capacitor 260 are electrically coupled to output 194.

In operation, lead compensation circuit 192 provides capacitive reactance to voltage regulator 100 to improve control stability of regulator 100. During recirculation system operation, voltage regulator 100 and MG 106 have a stable operating range that limits the maximum MG speed and thus limits the maximum core flow achievable. Operation above such range results in an oscillation of MG 106 output voltage and current. Oscillations of too great a magnitude causes an overcurrent relay to trip, shutting down the recirculation system. Lead compensation circuit 192 is coupled in parallel with resistor 190 and circuit 192. Resistor 190 and circuit 192 are further coupled in series with potentiometer 200. During recirculation system operation, lead compensation circuit 192 can be offline meaning switch 240 is open and circuit 192 has no effect on the operation of regulator 100. To bring circuit 192 online, switch 240 is closed in such a manner to not induce a transient into regulator 100 operation. An external variable resistor (not shown) is coupled to circuit 192 in parallel with switch 240. The external variable resistor is configured such that maximum resistance is provided between a first lead and a second lead. In the exemplary embodiment the external variable resistor has a maximum resistance of fifty thousand ohms. The first lead of the external resistor is electrically coupled to point 238. The second lead of the external resistor is electrically coupled to point 242 and switch 240 is closed. The resistance of the external resistance is sufficient to limit current through circuit 192 to a level in which circuit 192 is effectively not yet online. The resistance of the external resistor is slowly removed while observing a response of the recirculation system flow and MG 106 voltage and speed. When all resistance is removed from the external resistor, switch 240 is closed to activate lead compensation circuit 192 and the external resistance is removed from point 238 and point 242.

During startup of recirculation system, circuit 192 is offline for a time delay controlled by a setting of time delay relay 248. Contact 246 is held open to force circuit 192 current through resistor 244. In the exemplary embodiment, resistor 244 is a ten thousand ohm resistor. Resistor 244 limits current in circuit 192 sufficiently to limit its effect on the operation of regulator 100 during startup of the recirculation system. After the time delay setting of time delay relay 248 times out, contact 246 is closed, bypassing resistor 244 and allowing current to bypass resistor 244. The stability of regulator 100 is further adjusted by a position of switch 254. When switch 254 is open, current is forced through resistor 256 thereby limiting the effect of capacitor 260 on the lead compensation circuit. When switch 254 is closed, it bypasses resistor 256 allowing full current flow through capacitor 260 thereby increasing the lead compensation effect in regulator 100. In the exemplary embodiment, resistor 256 is a 10K ohm resistor, capacitor 258 is a 560 microfarad capacitor and capacitor 260 is a 640 microfarad capacitor.

Figure 5:
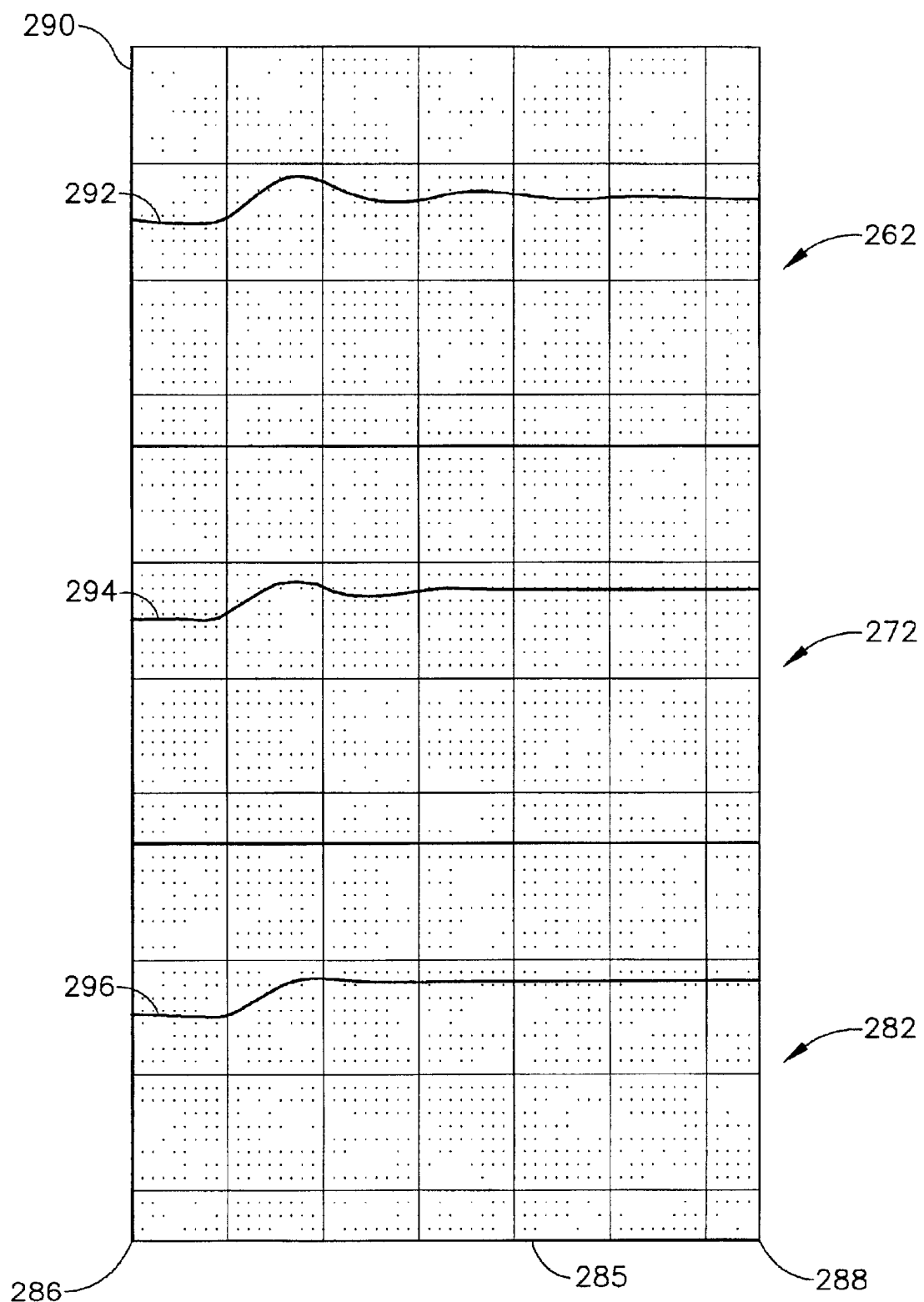
FIG. 5 is a graph showing three traces of voltage regulator response.

FIG. 5 is a graph showing three traces of voltage regulator 100 response with different values of negative feedback and lead compensation. A horizontal axis of each trace represents time from a time 286 which represents the beginning of a step change of 5 percent into control circuit 146 to a time 288 which represents a time after time 286 when an output is substantially stable. In the exemplary embodiment, time 286 is approximately 0 seconds and time 288 is approximately 12 seconds. A vertical axis 290 of the traces represents a magnitude of alternator 118 output voltage measured at the secondary winding of transformer 142. Trace 262 shows a magnitude 292 of system response with 560 microfarads of negative feedback in regulator 100 circuit. Trace 272 shows a magnitude 294 of system response with 1120 microfarads of negative feedback in regulator 100 circuit Trace 282 shows a magnitude 296 of system response with a lead compensation capacitance of 1120 microfarads in addition to 1120 microfarads of negative feedback.

The above-described lead compensation circuit is cost effective and highly reliable. The lead compensation circuit includes capacitive reactance that facilitates reducing recirculation system oscillations during operation greater than pre-uprate reactor core flow. The lead compensation circuit includes a plurality of capacitors that can be inserted and removed from service while the recirculation system is operating, facilitates operation and maintenance of the system. As a result, the lead compensation circuit facilitates reactor recirculation system operation and maintenance in a cost effective and reliable manner.

While the invention has been described in terms of various specific embodiments, those skilled in the art will recognize that the invention can be practiced with modification within the spirit and scope of the claims.

What is claimed is:

1. A method of regulating an output voltage of a boiling water reactor nuclear reactor plant recirculation system motor generator, said method comprising:

sensing an alternator output voltage and transmitting an alternator output voltage signal to a voltage regulator circuit;

sensing an alternator speed and transmitting an alternator speed signal to the voltage regulator circuit;

comparing the alternator output voltage signal to the alternator speed signal with a volts per hertz divider network electrically coupled to the alternator output voltage sensing circuit and the alternator speed sensing device;

adjusting a capacitive reactance of the voltage regulator with a lead compensation circuit electrically coupled in series with the volts per hertz divider network; and adjusting a current in a control winding of a saturable reactor.

2. A method in accordance with claim 1 wherein sensing the alternator speed comprises sensing the speed with a tachometer generator.

3. A method in accordance with claim 1 wherein sensing the alternator speed comprises sensing the speed with a speed transducer.

4. A method in accordance with claim 1 wherein comparing the alternator output voltage signal to the alternator speed signal further comprises using a volts per hertz divider network that includes a potentiometer.

5. A method in accordance with claim 1 wherein comparing the alternator output voltage signal to the alternator speed signal comprises using a volts per hertz divider network that includes a make before break rotary switch and fixed resistors electrically coupled to the switch contacts.

6. A method in accordance with claim 1 wherein adjusting the capacitive reactance comprises:

switching the lead compensation circuit into the regulator circuit;

limiting current during a startup time period using a resistor; and bypassing the resistor at the end of the startup time period.

7. A method in accordance with claim 6 wherein switching the lead compensation circuit into the regulator circuit comprises:

coupling a first lead of a variable resistance device to a first test point that is electrically coupled to a first lead of a lead compensation circuit engagement switch;

coupling a second lead of the variable resistance device to a second test point that is electrically coupled to a second lead of the lead compensation circuit engagement switch;

reducing a resistance of the variable resistance device to substantially zero ohms;

closing the lead compensation circuit engagement switch; and removing the variable resistance device first lead and second lead from the first test point and the second test point, respectively.

8. A method of bypassing the resistor at the end of the startup time period in accordance with claim 6 comprising bypassing the resistor at the end of a ten minute startup time period.

9. A method in accordance with claim 1 wherein adjusting the capacitive reactance comprises:

bypassing a resistor in series with each of a plurality of capacitors to increase capacitive reactance and removing the bypass around the resistor in series with the capacitors to decrease capacitive reactance.

10. A voltage regulator for a boiling water reactor nuclear reactor plant recirculation system comprising:

a variable frequency alternator;

an alternator output voltage sensing circuit electrically coupled to a control circuit;

an alternator speed sensing device electrically coupled to the control circuit;

a volts per hertz divider network electrically coupled to said alternator output voltage sensing circuit and said alternator speed sensing device;

a lead compensation circuit electrically coupled in series with said volts per hertz divider network; and a saturable reactor including a control winding electrically coupled to said volts per hertz divider network output, and a secondary winding electrically coupled to said alternator exciter.

11. A voltage regulator in accordance with claim 10 wherein said alternator speed sensing device comprises a tachometer generator.

12. A voltage regulator in accordance with claim 10 wherein said alternator speed sensing device comprises a speed transducer.

13. A voltage regulator in accordance with claim 10 wherein said volts per hertz divider network comprises a potentiometer.

14. A voltage regulator in accordance with claim 10 wherein said volts per hertz divider network comprises a make before break rotary switch and fixed resistors electrically coupled to said switch contacts.

15. A voltage regulator in accordance with claim 10 wherein said lead compensation circuit comprises:
   an engagement switch that electrically couples said lead compensation circuit to said regulator;
   a current limiting resistor in electrical parallel with a switch contact; and
   at least one capacitor.

16. A voltage regulator in accordance with claim 15 wherein said switch further comprises a test point electrically coupled to a first lead of said switch and a second test point electrically coupled to a second lead of said switch.

17. A voltage regulator in accordance with claim 15 wherein said switch contact is a contact of a time delay relay.

18. A voltage regulator in accordance with claim 17 wherein said time delay relay is set for a time delay of 10 minutes.

19. A voltage regulator in accordance with claim 17 wherein said at least one capacitor comprises a plurality of capacitors and shorting contacts configured to selectively bypass each capacitor when said shorting contacts are in a closed first position and to not bypass said capacitor when in an open second position.

20. A voltage regulator in accordance with claim 17 wherein said at least one capacitor comprises a current limiting resistor electrically coupled in series with said capacitor and a shorting contact electrically coupled in parallel with each resistor configured to selectively bypass each resistor when said shorting contacts are in a closed first position and further configured to not bypass said resistor when said shorting contacts are in an open second position.

21. A voltage regulator in accordance with claim 10 wherein said volts per hertz divider network output is electrically coupled to a control winding of a saturable reactor.

22. A reactor recirculation system for a boiling water reactor nuclear reactor plant recirculation system comprising:
   a motor-generator set comprising a variable frequency alternator;
   a voltage regulator electrically coupled to said alternator;
   an alternator output voltage sensing circuit electrically coupled to a control circuit of said voltage regulator;
   an alternator speed sensing device electrically coupled to the control circuit;
   a volts per hertz divider network electrically coupled to said alternator output voltage sensing circuit and said alternator speed sensing device;
   a lead compensation circuit electrically coupled in series with said volts per hertz divider network; and
   a saturable reactor including a control winding electrically coupled to said volts per hertz divider network output, and a secondary winding electrically coupled to said alternator exciter.

23. A reactor recirculation system in accordance with claim 22 wherein said alternator speed sensing device comprises a tachometer generator.

24. A reactor recirculation system in accordance with claim 22 wherein said alternator speed sensing device comprises a speed transducer.

25. A reactor recirculation system in accordance with claim 22 wherein said volts per hertz divider network comprises a potentiometer.

26. A reactor recirculation system in accordance with claim 22 wherein said volts per hertz divider network comprises a make before break rotary switch and fixed resistors electrically coupled to said switch contacts.

27. A reactor recirculation system in accordance with claim 22 wherein said lead compensation circuit comprises:
   an engagement switch that electrically couples said lead compensation circuit to said regulator;
   a current limiting resistor in electrical parallel with a switch contact; and
   at least one capacitor.

28. A reactor recirculation system in accordance with claim 27 wherein said switch further comprises a test point electrically coupled to a first lead of said switch and a second test point electrically coupled to a second lead of said switch.

29. A reactor recirculation system accordance with claim 27 wherein said switch contact is a contact of a time delay relay.

30. A reactor recirculation system in accordance with claim 29 wherein said time delay relay is set for a time delay of 10 minutes.

31. A reactor recirculation system in accordance with claim 29 wherein said at least one capacitor comprises a plurality of capacitors and shorting contacts configured to selectively bypass each capacitor when said shorting contacts are in a closed first position and to not bypass said capacitor when in an open second position.

32. A voltage regulator in accordance with claim 29 wherein said at least one capacitor comprises a current limiting resistor electrically coupled in series with said capacitor and a shorting contact electrically coupled in parallel with each resistor configured to selectively bypass each resistor when said shorting contacts are in a closed first position and further configured to not bypass said resistor when said shorting contacts are in an open second position.

33. A voltage regulator in accordance with claim 22 wherein said volts per hertz divider network output is electrically coupled to a control winding of a saturable reactor.

* * * * *